United States Patent [19]

Furlong

[11] 3,830,581

[45] Aug. 20, 1974

[54] GREEN WOOD JOINT

[75] Inventor: Donn B. Furlong, San Rafael, Calif.

[73] Assignee: Ecodye Corporation, Chicago, Ill.

[22] Filed: May 26, 1972

[21] Appl. No.: 257,124

[52] U.S. Cl............... 403/340, 29/446, 29/523, 29/526, 403/388
[51] Int. Cl............................................. F16b 7/00
[58] Field of Search........ 287/20.92 R, 20.92 T, 64, 287/189.36 D, 20.92 Y; 144/318, 309 L; 29/446, 523, 526; 182/112; 403/340, 339, 401, 402, 388

[56] References Cited
UNITED STATES PATENTS

| 77,733 | 5/1868 | Holzer | 182/112 |
|---|---|---|---|
| 1,413,395 | 4/1922 | Donnelly | 144/309 L |
| 1,587,445 | 6/1926 | Thomson | 29/526 |
| 1,979,686 | 11/1934 | Hall et al. | 29/523 |
| 3,270,410 | 9/1966 | Salter et al. | 29/446 |

FOREIGN PATENTS OR APPLICATIONS

| 1,099,472 | 1/1968 | Great Britain | 403/388 |
|---|---|---|---|
| 98,968 | 5/1923 | Switzerland | 287/20.92 R |
| 871,229 | 3/1953 | Germany | 287/189.36 D |
| 122,307 | 4/1931 | Germany | 287/20.92 R |

Primary Examiner—Thomas F. Callaghan
Attorney, Agent, or Firm—Joel E. Siegel; Charles M. Kaplan

[57] ABSTRACT

A method and apparatus for lengthening green wood structural members by joining the ends of at least two members in an end to end relationship in a manner which compensates for the shrinkage as the wood dries. The method includes the step of applying and retaining a compressive force of sufficient magnitude to the adjacent ends to compress the ends a distance greater than the joined members shrink during drying, the compressive force being of a magnitude less than the fiber stress at the proportional limit of the members at their initial moisture content. The apparatus includes a scarf joint having a plurality of transversely extending V-shaped teeth milled in the scarf surfaces and positioned in a meshing relationship. These V-shaped teeth in combination with the application of the compressive force results in a unique scarf joint which compensates for the shrinkage of the wood as it dries so as to substantially retain the axial and flexural strength of the joint. A plurality of tubular inserts pass through holes in the scarf surfaces and are flared at their respective ends to retain the compressive force applied to the scarf surfaces.

14 Claims, 4 Drawing Figures

PATENTED AUG 20 1974  3,830,581
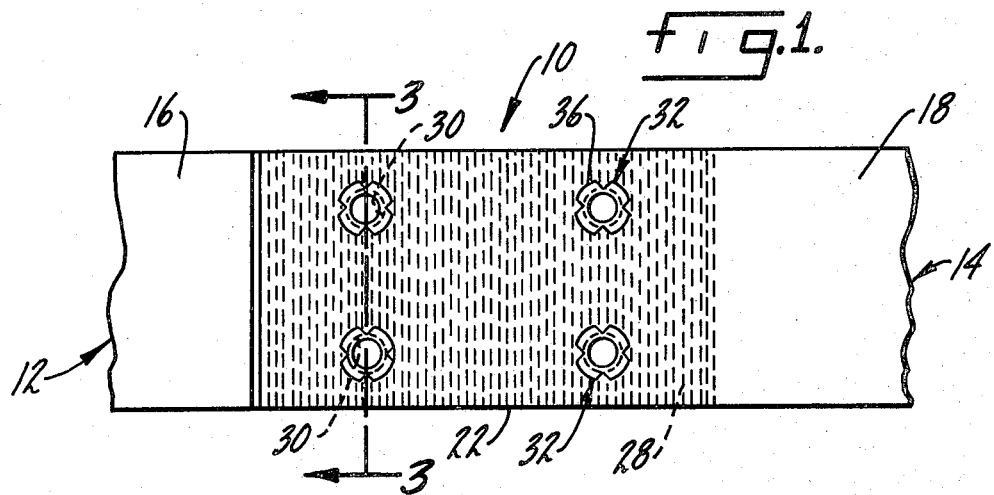
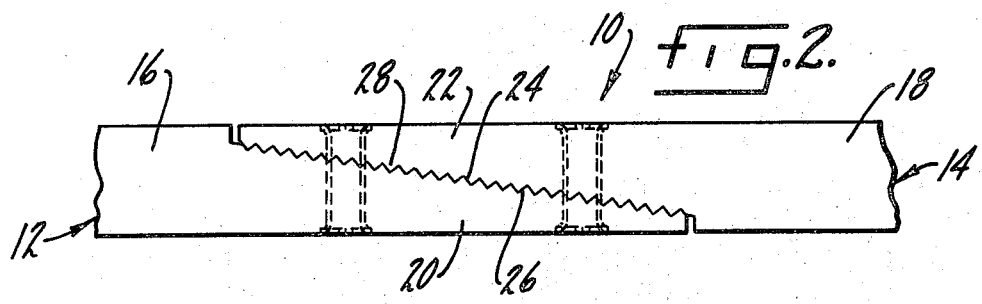
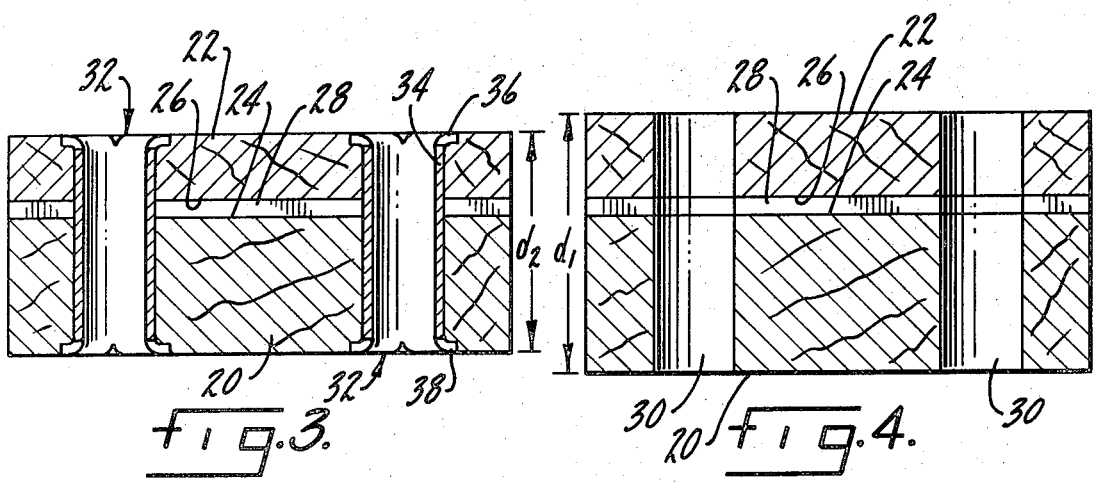

GREEN WOOD JOINT

BACKGROUND OF THE INVENTION

This invention relates generally to a method and apparatus for lengthening green wood structural members by joining the ends of at least two pieces in an end to end relationship, and more particularly to a structural scarf joint for securing green wood members together in an end to end relationship in a manner which compensates for shrinkage as the wood dries.

Lumber is supplied to many large industrial users in random lengths of green wood by the mills. Certain lengths cannot be used because of standardized components and structural dimensions. In many industries as much as a third of the green lumber received may not be in useable lengths. It has thus been a long standing need in the lumber industry to provide a joint to connect the respective ends of green wood members in an end to end relationship that is structurally sound after the wood dries.

One of the most important physical properties of wood is its affinity for moisture. This property is at times quite useful but often is detrimental in that it causes shrinkage and swelling with attendant changes in dimension. Shrinkage and swelling in wood are of different magnitudes in different directions; quite small in the direction of the fibers, fairly large in the radial direction, and largest of all in the tangential direction. The moisture content of green wood varies with the species of wood and the relative humidity and temperature of the surrounding air. Typically the moisture content of most structural species of green wood is in the range of 25 to 40 percent. Green wood when in contact with the air either gives up some of its moisture or absorbs more, depending upon the relative humidity of the surrounding air. If kept in air at 50 percent relative humidity and 70°F most species of wood will air-dry to substantial equilibrium at 12 to 15 percent moisture content. This reduction in moisture content as the green wood is air-dried results in shrinkage in tangential direction of from approximately 2 to 4 percent, depending upon the species of wood. If the green wood is oven-dried, shrinkage can be expected to be approximately twice that realized when air-dried.

It is this shrinkage property of wood that has heretofore made it impractical to join green wood in an end to end relationship. The heretofore used joints have tended to loosen as the green wood air-dries because of the shrinkage of the connected segments.

SUMMARY OF THE INVENTION

It is the principle object of the present invention to provide a method of joining together the adjacent ends of two green wood structural members to form a single structural member of increased length that substantially retains its strength properties as the members shrink due to drying.

Another object is to provide a method of joining together the adjacent ends of two green wood structural members to form a single structural member that compensates for shrinkage of the members by compressing the members at the time of joining without substantially weakening the wood due to crushing of the wood fibers.

A further object of the present invention is to provide a scarf joint for connecting together the adjacent ends of two green wood structural members to form a single structural member of increased length that substantially retains its strength properties as the members shrink due to drying.

A still further object is to provide a scarf joint of the type alluded to immediately above which includes shear resistance means associated with the scarf surfaces, is simple in construction and consequently inexpensive to manufacture.

The method of the present invention for joining together the adjacent ends of two green wood members in an end to end relationship includes the steps of applying and retaining a compressive force of sufficient magnitude to the adjacent ends to compress the ends a distance greater than the joined members shrink during drying, said compressive force additionally being of a magnitude less than the fiber stress at the proportional limit of the members at their initial moisture content (green wood). The structural scarf joint of the preferred embodiment includes a plurality of transversely extending V-shaped teeth milled in the scarf surfaces which are positioned in a meshing relationship. These V-shaped teeth in combination with the application of the compressive force mentioned above results in a unique scarf joint that permits green wood to be joined together in manner which compensates for shrinkage as the wood dries so as to substantially retain the axial and flexural strength of the joint.

For purposes of this disclosure and the appended claims the term "scarf joint" is intended to include any joint made by chamfering, halving, notching, or otherwise cutting away, two pieces to correspond to each other and securing them together after overlapping by bolting, riveting, welding, brazing, or the like. This class of joints includes the conventional half lap joint and the oblique scarf joint and various modifications of each.

BRIEF DESCRIPTION OF THE DRAWINGS

Other objects and features of the invention will become apparent to those skilled in the art as the disclosure is made in the following description of a preferred embodiment of the invention, as illustrated in the accompanying sheet of drawings, in which:

FIG. 1 is an elevational view of two structural members joined together in an end to end relationship by a scarf joint in accordance with the present invention;

FIG. 2 is a bottom plan view of the scarf joint shown in FIG. 1;

FIG. 3 is a sectional view taken along line 3—3 of FIG. 1; and

FIG. 4 is a sectional view similar to FIG. 3 illustrating the scarf joint in the condition prior to insertion of the fastening means and compression of the members; the dimensions being slightly increased for illustrative purposes.

DESCRIPTION OF A PREFERRED EMBODIMENT

Referring to FIGS. 1–3, a scarf joint 10 in accordance with the present invention is illustrated connecting together two structural members 12 and 14 in an end to end relationship. Since, as alluded to above, a principle objective of the present invention is to provide a scarf joint for joining green wood members; members 12 and 14 for purposes of this disclosure will be assumed to be of green wood having a moisture content in the range of 20 to 50 percent. However, it should be understood that this joint is also applicable for joining wooden members having a moisture content less than 20 percent in situations where shrinkage still remains a problem.

Members 12 and 14 have adjacent ends 16 and 18 respectively which are secured together in an end to end relationship. Ends 16 and 18 have substantially wedge shaped scarf portions 20 and 22 respectively formed therein. Scarf portions 20 and 22 each have a scarf surface 24 and 26 associated therewith; scarf surfaces 24 and 26 being scarfed in opposite or mating directions to each other and preferably having identical slopes. Scarf surfaces 24 and 26 further included shear resistance means in the form of a plurality of transversely extending V-shaped teeth 28 milled respectively therein; preferably perpendicular to the grain of the wood. Reference is made to U.S. patent application Ser. No. 107,928, having the same inventive entity and assignee as the present invention, for further disclosure of the geometry of teeth 28. Teeth 28 have inclined faces which intersect one-another with an included angle therebetween of preferably about 60°.

As best seen in FIG. 2, surfaces 24 and 26 are positioned facing one another with the respective teeth 28 in a meshing relationship. A plurality of holes 30 are drilled through scarf portions 20 and 22 for receipt of fastening means 32. Fastening means 32 preferably includes a plurality of tubular inserts 34 positioned within and substantially filling holes 30. Inserts 34 have opposite ends 36 and 38 which project beyond the outer surfaces of portions 20 and 22 respectively. Ends 36 and 38 are flared and countersunk into the outer surfaces of portions 20 and 22, as seen in FIGS. 1 and 3. Inserts 34 are preferably fabricated from stainless steel for strength and weather resistance.

The heart of the present invention is concerned with the compression of portions 20 and 22 to compensate for shrinkage as the wood dries. FIG. 4 illustrates the depth of joint 10 prior to the insertion of fastening means 32 and compression of portions 20 and 22 at $d_1$. FIG. 3 illustrates the depth of joint 10 after insertion of fastening means 32 and compression of portions 20 and 22 at $d_2$. In practicing the present invention the total shrinkage of portions 20 and 22 at joint 10 as the wood dries is less than or substantially equal to the difference between $d_1$ and $d_2$. Therefore, as the wood around joint 10 dries the portions 20 and 22 will remain in a tight fitting relationship with teeth 28 securely interlocked. The specific V-shape of teeth 28 in combination with the compression of portions 20 and 22 prevents the formation of open spaces between the meshing teeth 28 as the wood dries.

It is critical that the portions 20 and 22 be compressed a distance greater than or equal to the distance they shrink, however, the compressive force should not exceed the fiber stress at the proportional limit of portions 20 and 22. The amount of shrinkage and the maximum force that portions 20 and 22 can withstand without crushing the fibers (fiber stress at proportional limit) and consequently reducing their strength varies with the species of wood, moisture content and direction of the grain. These values are readily determined from independent tests or from tables available in various texts on the subject (i.e. U.S. Department of Agriculture Wood Handbook No. 72,1955 ). With the shrinkage known, then the compressive force required to compress the portions 20 and 22 beyond the shrinkage point may be determined by experimentation. This minimum compressive force must then be compared with the fiber stress at the proportional limit to ensure that the strength of the wood is not materially destroyed. The magnitude of the compressive force which is actually applied to portions 20 and 22 should be between these two values to ensure good results.

Once the magnitude of the compressive force which is to be applied to portions 20 and 22 is determined it is necessary to apply this force to portions 20 and 22 in a manner which evenly distributes this force over the entire extent of portions 20 and 22 and in a manner which is able to retain these end portions in compression upon removal of the applied force. This compressive force may be applied to portions 20 and 22 at each insert 34 by conventional presses of the type known in art, which are fitted with punches to flare out and countersink the ends 36 and 38 of each insert 34 to retain portions 20 and 22 in compression. Alternatively, a similar type press may be provided with a die arrangement which is designed to apply the compressive force to portions 20 and 22 over their entire outer surfaces and simultaneously flare out and countersink the ends 36 and 38 of all four inserts 34.

To substantiate the performance of the joint of the present invention the following strength test was conducted by the Columbia Research and Testing Corporation of Healdsburg, California in accordance with standard A.S.T.M. testing procedures. Six test samples in accordance with the present invention were made from nominal 2"×4" old growth redwood prepared from matched green stock. The compressive force applied to the toothed scarf joint area was 500 p.s.i.. This force was monitored by a gauge attached to the hydraulic press used to bend over the end of the four inserts. The value of 500 p.s.i. produces an average of 90 percent of the perpendicular to grain load capacity of the wood species (Redwood) thus compressing the wood fibers within the proportional limit of the material. Three of the test samples were tested in the green condition and three were dried to below the fiber saturation point before testing. Mild drying conditions of 110°F with a 10°F wet bulb depression were used to prevent damage to the samples. The three green condition samples had an average mositure content (at test) of 174.8 percent and the three dried samples had an average moisture content (at test) of 11.8 percent. The three green condition samples had an average net size of 1.615"×3.585" at the load point and the three dried condition samples had an average net size of 1.594"×3.493" at the load point. The six samples were loaded to failure in bending in a hydraulic testing machine. The load was applied to the center of the narrow face through a rounded loading block with a 2" radius. The samples were supported 27" o.c. on supports with a radius of 3/32". The load was applied at the rate of 0.1" per minute. The averaged total load at failure for the three green condition samples was 970 lbs. and the averaged total load at failure for the three dried condition samples was 867 lbs. The averaged Modulus of Rupture value (ratio of the maximum bending moment at failure to the moment of inertia of the cross section at the load point) for the three green condition samples was 1893 p.s.i. and the averaged Modulus of Rupture value for the three dried condition samples was 1791 p.s.i.. The averaged Modulus of Rupture for the dry condition samples was approximately 5 percent less than that for the green condition samples, which within the tolerance limits of this test indicates no significant loss of strength for the joint in the dry condition.

The method and specific joint disclosed hereinabove for joining the ends of green wood members effectively compensates for the shrinkage of the wood as it dries and thereby results in a structurally sound lengthened member. Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. A method of joining together the adjacent ends of first and second structural green wood members to form a single structural member of increased length, said structural members having an initial moisture content when joined together and a final moisture content after the members have been allowed to dry; comprising the steps of:
   a. forming cooperating scarf surfaces at said adjacent ends of said first and second members;
   b. positioning said scarf surfaces relative to each other in a facing relationship;
   c. applying a compressive force of sufficient magnitude to said adjacent ends to compress said adjacent ends by an amount at least equal to the amount that said joined members shrink as the moisture content of said members goes from said initial to said final moisture content, said compressive force additionally being of a magnitude less than the fiber stress at the proportional limit of said members at said initial moisture content; and
   d. securing said adjacent ends together while retaining said adjacent ends in compression.

2. The method of claim 1 wherein said compressive force is of a magnitude less than the perpendicular to grain fiber stress at the proportional limit of the species of wood at said initial moisture content.

3. The method of claim 1 wherein said scarf surfaces have shear resistance means formed thereon and said scarf surfaces are positioned relative to each other such that said shear resistance means are in an interlocking relationship.

4. The method of claim 1 wherein said compressive force is substantially evenly distributed over the entire extent of said adjacent ends.

5. The method of claim 1 further including the steps of:
   a. drilling a plurality of holes through said adjacent ends; and
   b. inserting fastening means within said holes to retain said adjacent ends in compression.

6. The method of claim 1 further including the steps of:
   a. drilling a plurality of holes through said adjacent ends;
   b. inserting tubular inserts within and substantially filling said holes having opposite ends projecting therethrough; and
   c. flaring said ends of said tubular inserts while simultaneously compressing said adjacent ends so as to retain said adjacent ends in compression upon removal of said compressive force.

7. A method of joining together the adjacent ends of first and second structural green wood members in an end to end relationship to form a single structural member of increased length, said structural members having an initial moisture content when joined together and a final moisture content after the members have been allowed to dry; comprising the steps of:
   a. forming cooperating scarf surfaces at said adjacent ends of said first and second members;
   b. positioning said scarf surfaces relative to each other in a facing relationship;
   c. determining the distance said adjacent ends will shrink while going from said initial moisture content to said final moisture content;
   d. determining the magnitude of the compressive force which must be applied to said adjacent ends to compress said adjacent ends at least the distance that they will shrink;
   e. determining the fiber stress at the proportional limit of said adjacent ends at their initial moisture content;
   f. applying a compressive force of sufficient magnitude to said adjacent ends to compress said adjacent ends a distance that said joined members shrink as determined by step (d), said compressive force additionally being of a magnitude less than the fiber stress at the proportional limit as determined by step (e);
   g. securing said adjacent ends together while retaining said adjacent ends in compression.

8. A scarf joint for joining together the adjacent ends of first and second structural green wood members to form a single structural member of increased length, said structural members having an initial moisture content when initially joined together and a final moisture content after the members have been allowed to dry; said scarf joint comprising:
   a. a first wooden member having a first scarfed end portion associated therewith;
   b. a second wooden member having a second scarfed end portion associated therewith;
   c. said first scarfed end portion being positioned in a facing relationship to said second scarfed end portion; and
   d. means for compressing and securing said first and second scarfed end portions together with a compressive force of sufficient magnitude to compress and retain said end portions at a distance greater than the distance said joined members shrink as the moisture content of said members goes from said initial to said final moisture content, said compressive force additionally being of a magnitude less than the fiber stress at the proportional limit of said members at said initial moisture content.

9. The invention of claim 8 wherein said compressive force is of a magnitude less than the perpendicular to grain fiber stress at the proportional limit of the species of wood at said initial moisture content.

10. The invention of claim 8 wherein said scarf surfaces have shear resistance means formed thereon and said scarfed surfaces are positioned relative to each other such that said shear resistance means are in an interlocking relationship.

11. The invention of claim 10 wherein said shear resistance means include V-shaped transversely extending teeth formed on said scarf surfaces.

12. The invention of claim 11 wherein said teeth have inclined faces such that the faces of adjacent teeth have an included angle therebetween in the range of 45° to 90°.

13. The invention of claim 8 wherein said compressive force is substantially evenly distributed over the entire extent of said end portions.

14. The invention of claim 8 wherein said means for compressing and securing said first and second scarfed end portions together includes;

a. a plurality of holes passing through said end portions; and
b. a plurality of tubular inserts positioned within and substantially filling said holes having opposite ends projecting therethrough;
c. said holes being flared so as to retain said end portions in compression upon removal of said compressive force.

* * * * *